(12) United States Patent
Stave et al.

(10) Patent No.: US 6,918,578 B2
(45) Date of Patent: Jul. 19, 2005

(54) POSITIONING AND CLAMPING SYSTEM

(75) Inventors: Hinrich Stave, Mindelheim (DE); Friedrich Windel, Landsberg (DE)

(73) Assignee: Grob-Werke Dr. h.c. mult. Dipl.-Ing. Burkhart Grob e.K., Mindelheim (DE)

( * ) Notice: Subject to any disclaimer, the term of this patent is extended or adjusted under 35 U.S.C. 154(b) by 103 days.

(21) Appl. No.: 10/390,174

(22) Filed: Mar. 18, 2003

(65) Prior Publication Data

US 2003/0227120 A1 Dec. 11, 2003

Related U.S. Application Data

(63) Continuation of application No. 09/895,203, filed on Jul. 2, 2001, now abandoned.

(30) Foreign Application Priority Data

Jun. 30, 2000 (DE) .......................................... 100 31 103

(51) Int. Cl.$^7$ ................................................ B23Q 3/00
(52) U.S. Cl. ....................................................... 269/309
(58) Field of Search ................................. 269/309, 310, 269/48.1, 56, 52, 20; 198/345

(56) References Cited

U.S. PATENT DOCUMENTS 4,934,680 A * 6/1990 Schneider .................... 269/309

* cited by examiner

Primary Examiner—Robert C. Watson
(74) Attorney, Agent, or Firm—Jacobson Holman PLLC

(57) ABSTRACT

A positioning and clamping system, in particular for positioning and clamping a workpiece-bearing pallet 1 on a pallet receiving table 2, consists of at least two conical supports 4 arranged spaced from each other on the pallet receiving table 2 and at least two tapered sleeves 3 adapted to cooperate with the conical supports, the tapered sleeves being connected to the pallet 1 on the side which is to be located on the table. The at least one cone angle $\alpha_1$, $\alpha_2$ of one of the conical supports 4 and the tapered sleeve 3 adapted to cooperate therewith has an angle size which is suitable for the introduction of a self-locking connection between the support and the tapered sleeve upon cooperation thereof.

12 Claims, 3 Drawing Sheets

POSITIONING AND CLAMPING SYSTEM

This is a Continuation of application Ser. No. 09/895,203 filed Jul. 2, 2001 now abandoned.

BACKGROUND OF THE INVENTION

The present invention relates to a positioning and clamping system which is suitable in particular for positioning and clamping a workpiece-carrying pallet on a pallet receiving table. The system comprises at least two conical supports arranged spaced from each other on the pallet receiving table and at least two tapered sleeves, adapted to cooperate with the conical supports, which are connected to the pallet on the side which is to be located on the table.

It is known to mount workpieces which have, for example, to be machined in metal or plastics material processing operations in a machining procedure with various machines, on pallets, to allow quick and precise replacement of the workpiece together with the pallet at the machining location of a machine with a subsequent workpiece, without further disassembly or assembly of the workpiece itself. As a result of using a pallet on which the workpiece is mounted, it is necessary that only the pallet and not the workpiece itself is clamped or unclamped at the machining location in order to produce the machining position of a workpiece. A quick-change system of the workpiece of this type has proved to be particularly advantageous in machining centres with more than one machine machining the workpiece.

The pallet to be clamped is positioned and securely clamped with the workpiece located thereon to a machining table or a pallet receiving table which can be located at or on a machine tool. Such positioning must be able not only to take place extremely precisely as the exact machining of the workpiece is dependent on the precise positioning, but it must also be easy to carry out, like the clamping of the pallet, wherein it should be noted that the region of the pallet receiving table is generally heavily soiled by shavings and lubricating oil or liquid coolant.

The advantage of using a pallet for clamping a workpiece is that the pallet has consistently uniform connection geometry with respect to the workpiece which is replaced, and therefore very quick positioning and clamping of the workpiece relative to the working spindles of the machine tools is possible owing to this consistent connection geometry.

The pallets can have a size of, for example 800×800 mm to 800×1000 mm.

The machining or pallet receiving table can be designed as a circular table which has a pallet mount which is rotatably mounted in the substantially vertically oriented axis of rotation.

Known pallet clamping stations consist, for example, of two pins which are arranged on the machining table in a common plane and which are received in correspondingly arranged bushes on the underside of the pallet. A planar system of this type allows the pallet to be fixed in a plane, wherein the height of the pallet to be positioned is determined by the placement thereof on the machining table.

An arrangement for positioning a pallet on a machining table is also known in which four cones are arranged on the machining table. With a cone angle of approximately 60° the cones are relatively flat and have a diameter of approximately 80 mm. There are tapered sleeve-shaped bushes on the underside of the pallet corresponding to the cones arranged on the table which are to cooperate with the cones. Furthermore, there are clamping jaws on each cone for clamping of the pallet which are intended to avoid slippage of the pallet on the machining table after it has been positioned. Owing to the quadruple arrangement of the cones, which, moreover, also allow positioning perpendicular to the plane of the table as well as in the plane of the table, such a system is twice four times over defined. This means that measuring inaccuracies in only one of the four cones can render the entire arrangement inaccurate. In other words precise fixing of the pallet on the machining table is no longer possible. Such a measuring inaccuracy of only one cone can occur owing to the simple fact that additional layers, such as impurities, have been deposited on the cone surface of one cone to a greater extent than on the cone surface of the adjacent cone.

It is an object of the present invention to provide improved positioning and clamping of workpiece-carrying pallets on a pallet receiving table of a machine tool or in machining centres in such a way that over definition of the entire arrangement is not possible, but quick, precise and simple positioning of the pallet on the pallet receiving table and reliable and secure clamping of the pallet to the pallet receiving table is possible, and to overcome the given disadvantages of the systems according to the state of the art.

BRIEF SUMMARY OF THE INVENTION

The present invention provides a pallet receiving table with at least two conical supports and the tapered sleeves on a pallet adapted to cooperate therewith, wherein the at least one cone angle of one of said conical supports and said tapered sleeve adapted to cooperate therewith has a suitable angle size to introduce a self-locking connection between said support and said tapered sleeve, upon cooperation thereof.

Preferred embodiments of this positioning and clamping system are characterised in the sub-claims.

On the one hand, as a result of using a steeper cone angle, a shrink fit of the tapered sleeve on the conical support occurs as soon as a clamping force is exerted by means of claws on a journal which is arranged in the tapered sleeve. A connection between tapered sleeve and cone, which can be re-released after removal of the clamping force, is produced as a result because, owing to the use of a steeper cone angle, the tapered sleeve extended by the clamping force detaches itself from the conical support compressed by the clamping force and a gap is produced between conical support and the tapered sleeve in the axial direction of approximately 0.1 to 0.15 mm.

On the other hand, positioning of the pallet on the pallet receiving table is facilitated as a result of using a steeper angle for the conical form in the support because, as a result, the centring path of the tapered sleeve is extended on the conical support to approximately 10 mm, allowing early centring of the pallet on the pallet receiving table during the positioning process.

In an advantageous embodiment the conical support and the tapered sleeve adapted to cooperate therewith has a two-stage conical form with, seen from the cone tip, a first and second cone angle, the second cone angle having a smaller angle size than the first cone angle. The second cone angle of the tapered sleeve can simultaneously be designed as an annular projection in the direction of the table, in other words at the bottom end of the tapered sleeve, provided the table is arranged horizontally, and the conical support has, as a counterpart, an annular planar rest cooperating therewith. This results in the combination of a conical system with a planar system, in other words, in the clamped state the placement of the tapered sleeve on the conical support, on the one hand, on the cone envelope faces and, on the other hand, on a plane face. The distance between pallet and pallet receiving table is therefore determined not only by the conical form of the support and the tapered sleeve but also by the plane rest of the annular projection on the annular planar rest. Therefore, not only a centring process which is easy to carry out, but also the presence of a shrink fit which can easily be re-released, and height adjustable planar faces for an optimal fit and for a limited positioning path of the tapered sleeve on the conical support, are to be quoted as particular advantages of the invention.

In an arrangement of four supports on a pallet receiving table for mounting a pallet, a second conical support can have a reduced centring area of support of a type such that the external surface of the cone of the support has longitudinally extending interruptions, in other words can be designed, for example, as a sword bolt. Such a sword bolt supports a tapered sleeve in the peripheral direction only and this only in places. If the two remaining supports are designed in the shape of a cone, but still with a gap between the cone and the tapered sleeve even in the clamped state, and therefore act as an annular support only in the vertical direction and not in the peripheral direction as supports, the entire positioning and clamping system then has a predetermined peripheral margin between pallet and pallet receiving table of not more than 5 µm, whereby jamming of the pallet with respect to the pallet receiving table in the closest diagonals is no longer possible. Over definition of the entire system is therefore prevented.

In an advantageous embodiment air can be supplied via a supply system provided for this purpose in a gap between the support and the sleeve, during positioning and clamping of the pallet to the pallet receiving table, in order to clean the cone walls of the tapered sleeve and the conical support, of shavings and impurities with the air brushing along the walls and in order to check the cooperation of support and sleeve by means of the quantities of inflowing air.

BRIEF DESCRIPTION OF THE DRAWINGS

Further details, advantages and developments of the invention emerge from the following description of the preferred embodiment and by reference to the drawings, in which.

DETAILED DESCRIPTION

The invention is used not exclusively, but is used preferably, for clamping and positioning a workpiece-bearing pallet on a pallet receiving table with at least two conical supports arranged on the pallet receiving table and at least two tapered sleeves adapted to cooperate with the conical supports, which sleeves are connected to the pallet on the side which is to be located on the table.

Figure 1:
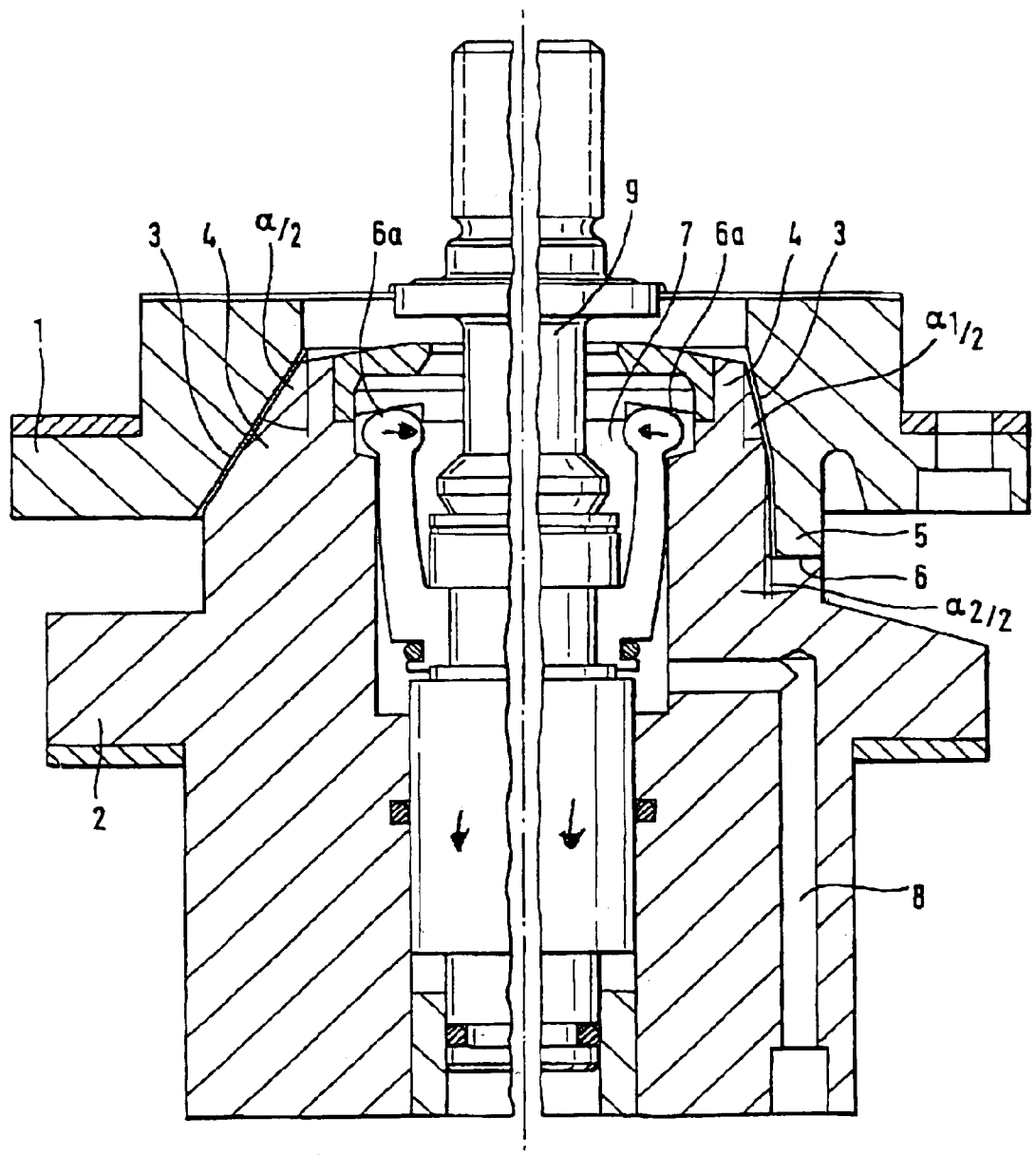
FIG. 1 is a cross-sectional view of a support together with the tapered sleeve cooperating therewith, wherein in the left-hand half, viewed from the centre line, a design according to the state of the art is shown and in the right-hand half, a design according to the invention.
Figure 1B:
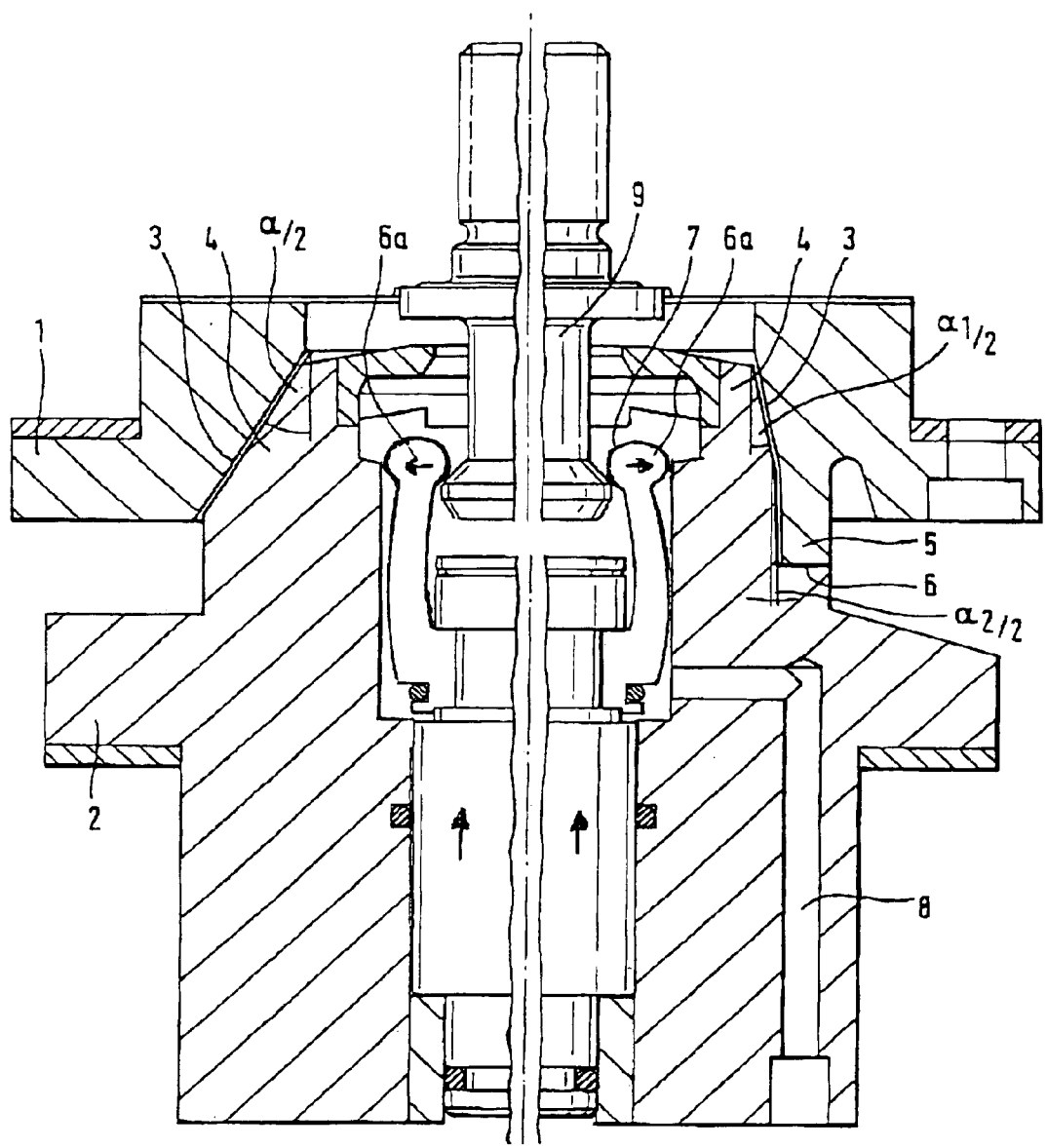
FIG. 1b is a cross-sectional view similar to FIG. 1 and illustrating clamping tong 6a engaging journal 9.

FIG. 1 shows the bottom region of a pallet 1 which is located on supports 4 which are arranged on a pallet receiving table 2. The bottom of the pallet is equipped with a sleeve, preferably a tapered sleeve 3, in which a journal 9 is arranged which is grasped and tightened by a claw-like clamping tong 6a which is provided in the support 4 of the pallet receiving table.

The embodiment according to the state of the art depicted on the left-hand side comprises of a cone or truncated cone 4 and a tapered sleeve 3 cooperating therewith. The tapered sleeve rests on the truncated cone 4 with the pallet bottom part 1, wherein the half of the cone angle α is approximately 30° and consequently the entire cone angle is 60° in size. Location of the tapered sleeve 3 on the conical support primarily takes place at the cone external surfaces of the conical support as can be seen from the left-hand half of FIG. 1.

A development of this type with all four support points of the pallet on the pallet receiving table inevitably leads to such a system being twice four times over defined owing to positioning in the table plane and perpendicular to the table plane only by means of cones with relatively large cone angles. Consequently, a measuring inaccuracy at one of the cone faces, as can be produced, for example by impurities and dirt particles on the external surface of a cone, may render the entire arrangement inaccurate and unstable.

The right-hand half in FIG. 1, viewed in relation to the vertically extending centre line of the figure, shows an embodiment of the positioning and clamping system according to the invention, the conical support 4 having in its two-stage conical form a first cone angle $\alpha_1$ and a second cone angle $\alpha_2$. These cone angles are preferably of an angle size of 1° to 30°, in particular approximately 15°. As a result of such steeply formed conical forms of the conical support 4 and of the tapered sleeve 3 cooperating therewith it is possible to achieve a self-locking connection between the tapered sleeve and the conical support.

An annular projection 5 which, in this case, simultaneously forms the second cone stage with the cone angle $\alpha_2$ of the conical support or of the tapered sleeve is also formed on the bottom, in other words table side, end of the tapered sleeve 3 which in the clamped state rests on an annular planar rest 6 of the support 4.

If the pallet is now placed on the pallet receiving table, initially centring by means of the conical portion of the support 4 and of the sleeve 3 takes place over a centring path of approximately 10 mm. After the tapered sleeve has been placed on the cone external surface of the conical support 4 and before a clamping process is initiated, there is a gap between the annular projection 5 and the annular planar support 6 of approximately 1/10 mm. If the clamping process is now initiated by means of claw-like clamping tongs, and the pallet 1 on the pallet receiving table 2 is pulled downward then the annular projection 5 is elastically deformed, in other words expanded, and the support 4 is compressed in its conically shaped portion. The above-mentioned gap between the annular projection 5 and the annular planar rest 6 closes as a result. The planar rest 6 which is itself height adjustable (not shown), therefore determines the extent of the expansion or compression of the tapered sleeve 3 or of the conical support 4 required. If the planar rest 6 is arranged more deeply then a greater expansion or compression takes place. It can be seen from this that, owing to the interaction of a planar system, as provided by the planar rest 6 and the annular projection 5, and the cone-shaped system, limited expansion/compression of the tapered sleeve/conical support is possible and therefore a shrink fit of the tapered sleeve on the conical support is provided. This shrink fit means that the connection between tapered sleeve and the conical support can be re-released owing to the elastic deformation.

Air or any other gaseous medium can be conveyed to a gap 7 between the support 4 and the sleeve 3 cooperating therewith or the journal 5 connected to the sleeve via a feed line 8, which air escapes upon joining of the tapered sleeve 3 to the conical support 4 via the cone external surfaces and the faces of the planar rest 6, and cleans these as a result. Consequently, a cleaning effect of the support and the tapered sleeves cooperating therewith is achieved during positioning of the pallet 1 on the pallet receiving table 2. In addition, this air, or air supplied separately, can serve to control the cooperation of support and tapered sleeve; in other words to check, for example, for the presence of a tapered sleeve on a conical support by means of pressure monitoring of the air supplied.

It is also possible for cleaning purposes and for the purpose of improved and more finely adjusted positioning of the supporting tapered sleeves 3, to spray these with any suitable fluid during the positioning process.

Pre-centring during positioning of the pallet on the pallet receiving table by means of an energy coupling device in the centre of the surface of the pallet receiving table is possible before the centring effect of the cone by the conical supports is initiated during the positioning process.

The pallet receiving table can be formed as a circular table with a rotating pallet mount, the axis of rotation of which points in the direction of the table surface normal lines.

Figure 2:
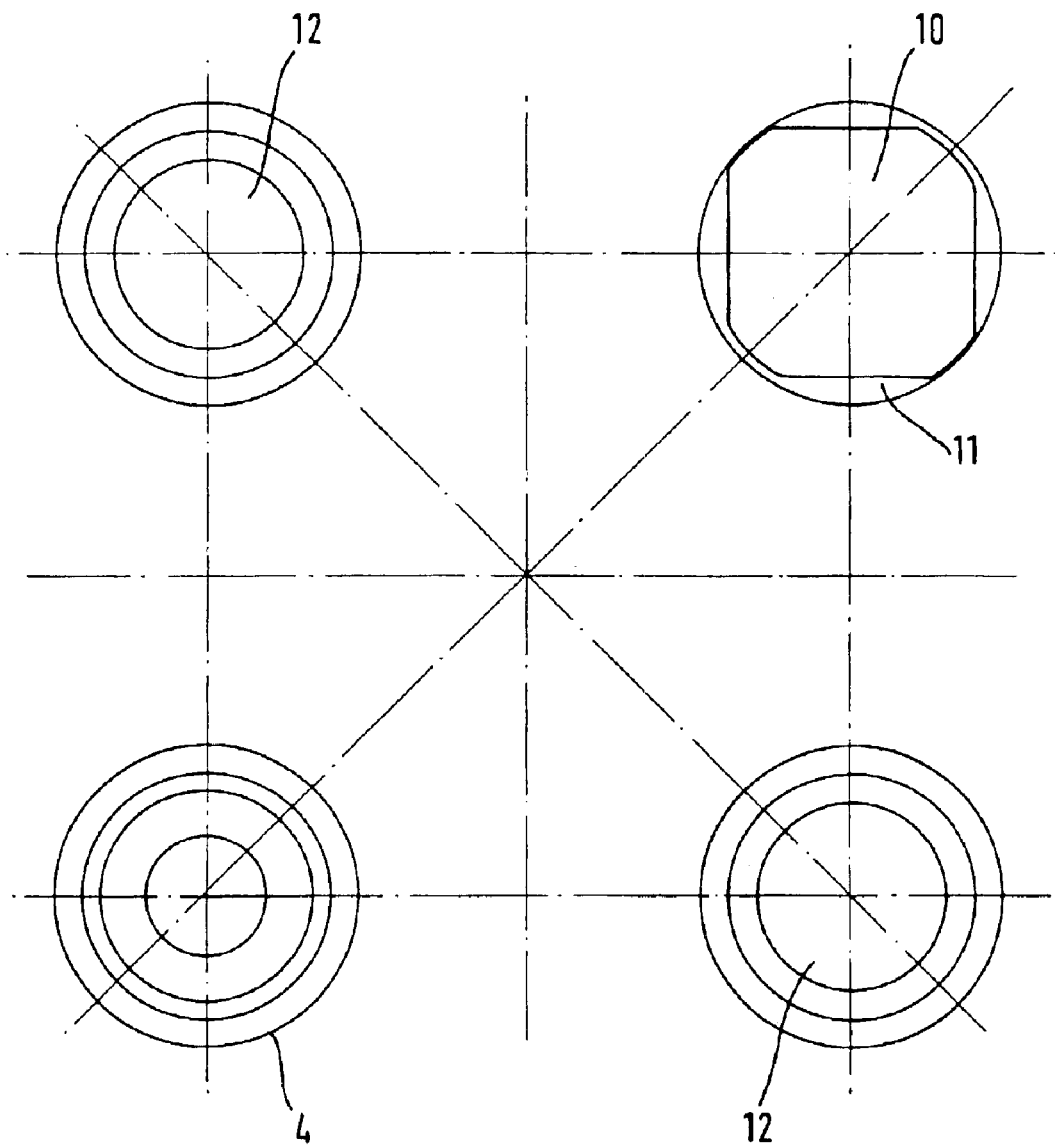
FIG. 2 is a schematic plan view of a pallet receiving table, of an embodiment of the positioning and clamping system according to the invention.

FIG. 2 shows in a plan view a pallet receiving table with four supports distributed over the table face. The support 4 corresponds in this case to a support according to the invention already described in more detail in conjunction with FIG. 1.

The support 10 also has the shape of a cone, but with a cone external surface which has longitudinally extending interruptions 11, in other words interruptions which extend from an (imaginary) cone tip to the cone foot. A cone with an external surface, which, for example, can consist of four portions, is produced by such a reduced centring rest. A design in the shape of a sword bolt is also possible. The interruptions can be created by oblique milling of the external surfaces. A support of this type therefore bears a tapered sleeve cooperating therewith only in the peripheral direction and is arranged diagonally to the support 4. The combination of these two supports 4 and 10 leads to a predetermined peripheral play of the pallet 1 with respect to the pallet receiving table of approximately 5 $\mu$m and therefore jamming of the pallet on the pallet receiving table in the diagonals during or after the clamping process is not possible.

The two remaining supports 12 are characterised by an annular planar rest which cooperates with an annular projection on the tapered sleeve similar to the two supports first mentioned. These supports also have conical portions which, however, do not connect during the clamping process with their external surfaces to the internal surfaces of the tapered sleeves cooperating therewith, rather, a gap is maintained between the support and tapered sleeve even during the clamping process, so that the cone external surfaces of the conical support do not act as bearing faces. The annular planar rest, however, acts as a support for the tapered sleeve and the pallet 1 connected thereto in the direction acting perpendicular to the table surface.

Each of the supports 4, 10 and 12 is equipped with a claw-like clamping tong 6.

Any conical supports are conceivable as developed cones or flattened cones.

Owing to the arrangement according to the invention of four different supports, as shown in FIG. 2, over-definition of the entire system produced as a result of the arrangement of four identical conical supports with large cone angle, is ruled out.

What is claimed is:

1. Positioning and clamping system, for positioning and clamping a workpiece-bearing pallet on a pallet receiving table, said system comprising:
   at least two conical supports arranged spaced from each other over the pallet receiving table and at least two tapered sleeves adapted to cooperate with said conical supports and which are connected at a side of said table to said pallet, at least one cone angle of one of said conical supports and of said tapered sleeve adapted to cooperate therewith has an angle size to introduce a self-locking connection between said support and said tapered sleeve upon cooperation thereof, said tapered sleeve having an annular projection at the side of the table and said conical support having an annular planar rest cooperating therewith.

2. System according to claim 1, wherein said conical support and said tapered sleeve adapted to cooperate therewith have a two-stage conical from with, viewed from the cone tip, a first ($\alpha_1$) and a second cone angle ($\alpha_2$) with smaller angle size.

3. System according to claim 1 wherein said angle sizes are in a range from 1° to 30°.

4. System according to claim 1, wherein said tapered sleeve can be extended in its size to a limited degree and said conical support can be compressed in its size to a limited degree.

5. System according to claim 1 wherein in addition to said one conical support, at least one further support in the form of a cone with a cone envelope which has longitudinally extending interruptions, is arranged on said pallet receiving table.

6. System according to claim 1 wherein at least one further support is arranged in the form of an annular planar rest.

7. System according to claim 6, wherein at least one sleeve with an annular projection cooperating with said annular planar rest is connected to the pallet at he table side.

8. System according to claim 1, wherein a gap between said support and said cooperating sleeve serves to supply air.

9. System according to claim 8 wherein a device for controlling the cooperating of support and sleeve by means of the air flowing into said gap is associated with said system.

10. System according to claim 1, wherein a coupling device is attached in a center of the surface for a pre-centering process during positioning of said pallet on the pallet receiving table.

11. System according to claim 1, wherein said pallet receiving table is a circular table on which a pallet mount is rotatably mounted about an axis of rotation pointing in a direction of a table surface normal line.

12. Positioning and clamping system comprising:
   a workpiece-bearing pallet,
   a pallet receiving table,
   at least two conical supports arranged spaced from each other over the pallet, receiving table and at least two tapered sleeves adapted to cooperate with said conical supports and connected at a side of said table to said pallet,
   at least one cone angle of one of said conical supports and of said tapered sleeves adapted to cooperate therewith having an angle sized to introduce a self-locking connection between said supports and said tapered sleeves upon cooperation thereof,
   said tapered sleeves having an annular projection at the side of the table and said conical supports having an annular planar rest cooperating therewith, and
   said pallet receiving table including clamping tongs located in an opening of said tapered sleeves to clamp a portion of the pallet.

\* \* \* \* \*